(12) United States Patent
Bai et al.

(10) Patent No.: US 12,399,358 B2
(45) Date of Patent: Aug. 26, 2025

(54) PHASE RETRIEVAL DETECTION DEVICE AND METHOD BASED ON DIFFRACTION INFORMATION OF FRESNEL ZONE PLATE

(71) Applicant: ZHEJIANG UNIVERSITY, Zhejiang (CN)

(72) Inventors: Jian Bai, Zhejiang (CN); Binjie Lu, Zhejiang (CN); Lei Zhao, Zhejiang (CN); Xiao Huang, Zhejiang (CN); Jing Hou, Zhejiang (CN)

(73) Assignee: ZHEJIANG UNVIERSITY, Zhejiang (CN)

( * ) Notice: Subject to any disclaimer, the term of this patent is extended or adjusted under 35 U.S.C. 154(b) by 728 days.

(21) Appl. No.: 17/615,314

(22) PCT Filed: Jul. 20, 2020

(86) PCT No.: PCT/CN2020/102927
§ 371 (c)(1),
(2) Date: Nov. 30, 2021

(87) PCT Pub. No.: WO2021/031763
PCT Pub. Date: Feb. 25, 2021

(65) Prior Publication Data
US 2022/0221633 A1 Jul. 14, 2022

(30) Foreign Application Priority Data
Aug. 21, 2019 (CN) .......................... 201910772333.9

(51) Int. Cl.
G02B 21/14 (2006.01)
G01B 9/02 (2022.01)
(Continued)

(52) U.S. Cl.
CPC ......... *G02B 21/14* (2013.01); *G01B 9/02049* (2013.01); *G01B 11/254* (2013.01); *G02B 5/1876* (2013.01); *G02B 27/0012* (2013.01)

(58) Field of Classification Search
CPC .. G02B 5/1876; G02B 27/0012; G02B 21/14; G01B 9/02049; G01B 11/254
See application file for complete search history.

(56) References Cited

U.S. PATENT DOCUMENTS

| 4,637,697 A | * | 1/1987 | Freeman | ................ G02C 7/042 |
| | | | | 359/742 |
| 2009/0261250 A1 | * | 10/2009 | Zhou | .................... G02B 5/1809 |
| | | | | 250/306 |
| 2012/0257197 A1 | * | 10/2012 | Feldkhun | ........... G01N 21/4795 |
| | | | | 356/450 |

FOREIGN PATENT DOCUMENTS

| CN | 102865832 A | * | 1/2013 | ............ G01M 11/02 |
| CN | 106338343 A | * | 1/2017 | ................ G01J 9/00 |
| CN | 108801475 A | * | 11/2018 | ................ G01J 9/00 |

OTHER PUBLICATIONS

E. Lalor, A new approach to the inverse diffraction problem, 1969, J. Phys a, Ser. 2, vol. 2, pp. 236-240 (Year: 1969).*

(Continued)

*Primary Examiner* — Michael P LaPage
(74) *Attorney, Agent, or Firm* — Raj S. Dave; Dave Law Group LLC

(57) ABSTRACT

A phase retrieval detection device based on diffraction information fusion of a Fresnel zone plate (FZP) (7) is provided, including a laser (1), an attenuation mirror (2), a micro-objective (3), a pinhole filter (4), a collimating objective (5), an element (6) to be detected, an FZP (7), and an image acquisition device (8) that are sequentially arranged along a light path. The phase retrieval detection device uses the FZP (7) as a light beam convergent element instead of a (Continued)

conventional lens, and makes an acquired diffraction spot contain more diffraction information by virtue of a multi-focus characteristic of the FZP (7). Based on a classical iterative phase retrieval method, a phase retrieval method based on the diffraction information fusion of the FZP (7) uses a diffraction light intensity distribution modulated by the FZP for retrieval to reconstruct a wider band of a wavefront to be detected.

4 Claims, 5 Drawing Sheets

(51) Int. Cl.
   *G01B 11/25* (2006.01)
   *G02B 5/18* (2006.01)
   *G02B 27/00* (2006.01)

(56) References Cited

OTHER PUBLICATIONS

D. Russell Luke, Relaxed Averaged Alternating Reflectionsfor Diffraction Imaging, May 11, 2004, 13 pages, Version 2.2, http://arxiv.org/abs/math/0405208v1.
Bruce H. Dean and Charles W. Bowers, Diversity selection for phase-diverse phase retrieval, Aug. 2003, 15 pages, vol. 20, No. 8.
J. R. Fienup, Phase retrieval algorithms: a comparison, Applied Optics, Aug. 1, 1982, 12 pages, vol. 21, No. 15.
J. Phys. A (Gen, Phys.), A new approach to the inverse diffraction problem 1969, Ser. 2, vol. 2, 5 pages.

* cited by examiner

PHASE RETRIEVAL DETECTION DEVICE AND METHOD BASED ON DIFFRACTION INFORMATION OF FRESNEL ZONE PLATE

CROSS-REFERENCE TO RELATED APPLICATIONS

The present application is the U.S. National Stage Entry of PCT/CN2020/102927, filed on Jul. 20, 2020, which claims the priority to the Chinese Patent Application No. 201910772333.9, filed with the China National Intellectual Property Administration (CNIPA) on Aug. 21, 2019, and entitled "PHASE RETRIEVAL DETECTION DEVICE AND PHASE RETRIEVAL METHOD BASED ON DIFFRACTION INFORMATION FUSION OF FRESNEL ZONE PLATE", the entire disclosures of which are incorporated herein by reference as part of the disclosure of this application.

TECHNICAL FIELD

The present disclosure relates to the technical field of optical detection, and in particular, to a phase retrieval detection device and a phase retrieval method based on diffraction information fusion of a Fresnel zone plate (FZP).

BACKGROUND ART

Various optical elements with high precision and high quality have been widely applied to modern large optical systems such as large lasers and space telescopes. In order to meet requirements of the systems on high power and high energy in actual use, the optical elements need to have better surface quality, and the surface quality determines performance of the optical systems. When the optical elements are machined with a modern optical machining method, there will be machining errors of different frequencies on surfaces of the optical elements. Based on spatial frequencies, these errors may be approximately divided into low-frequency errors, medium-frequency errors and high-frequency errors, among which the low-frequency errors are mainly present in form of various aberrations, the medium-frequency errors can introduce sidelobes of focal spots, and the high-frequency errors can lead to laser light scattering. A surface error of an element itself can be considered as superposition of the above three unrelated errors, which seriously affects convergence of strong laser light beams.

A detection of the surface is of great importance to better restrict and control the machining errors on the surfaces of the elements. Conventional wavefront detection methods such as interference detection, coordinate detection and Hartmann wavefront sensor detection are still defective in actual use. The interference detection requires a complicated detection device and has high requirements for a detection environment, despite high detection precision and good measurement repeatability. The coordinate detection and the Hartmann wavefront sensor detection hardly implement wavefront reconstruction at high precision. In recent years, phase retrieval as the wavefront detection method based on computational imaging has widely researched. The phase retrieval inversely solves original wavefront distribution through diffraction intensity information, with a simple experimental device and strong resistance to environmental disturbance. However, conventional phase retrieval methods typically use a common lens with a single focus as a convergent element and acquire a light intensity map at a single position for wavefront computation and reconstruction. According to related research, a band where wavefronts are intensively distributed in the phase retrieval and reconstruction is closely associated with an off-focus distance, and wavefront errors of different spatial frequencies have an optimal light intensity acquisition position. Hence, the amount of information included in the light intensity map that is obtained from an image sensor with the conventional method is limited, resulting in that a retrieved wavefront band may only fall into a certain special band. Therefore, the conventional phase retrieval method cannot implement the wide-band wavefront reconstruction.

SUMMARY

In view of defects of the conventional art, the present disclosure intends to provide a phase retrieval detection device and a phase retrieval method based on diffraction information fusion of a Fresnel zone plate (FZP), to solve a problem that band retrieved by a conventional phase retrieval method during wavefront reconstruction is relatively narrow.

The effect of the present disclosure is achieved by the following technical solutions.

A phase retrieval detection device based on diffraction information fusion of an FZP includes a laser, an attenuation mirror, a micro-objective, a pinhole filter, a collimating lens, an element to be detected, an FZP and an image acquisition device that are sequentially arranged along a light path, where the laser is arranged in parallel with the attenuation mirror; the micro-objective is positioned behind the attenuation mirror; the pinhole filter is positioned behind the micro-objective and at a convergent focus of the micro-objective; the collimating lens is positioned behind the pinhole filter, a front focus of the collimating lens is located at the pinhole filter; the element to be detected is positioned behind the collimating lens; the FZP is positioned behind the element to be detected; and the image acquisition device is positioned behind the FZP and at an off-focus position of the FZP.

Further, the FZP is a phase zone plate.

Further, the image acquisition device is a charge coupled device (CCD) camera.

Further, the laser 1 is configured to generate laser light having a wavelength of 632.8 nm.

A phase retrieval method based on diffraction information fusion of an FZP is implemented based on the above detection device, and includes the following steps:

generating laser light by a laser, where the laser light is sequentially attenuated by an attenuation mirror, converged by a micro-objective, filtered by a pinhole filter and collimated by a collimating lens into parallel light to enter an element to be detected; converging, by entering the FZP, an emitted light wave of the element to be detected; acquiring, by an image acquisition device, at an optimal off-focus position of the FZP, a light intensity map carrying composite band diffraction information, and calculating, with the phase retrieval method, an emitted phase of the element to be detected, to obtain a surface error distribution of the element to be detected.

Further, the phase retrieval method is an iterative phase retrieval method; and the calculating, with the phase retrieval method, the emitted phase of the element to be detected may specifically include:

(1) using a phase distribution of the FZP as an initial estimated value of a wavefront phase to be detected;

(2) diffractively propagating, through a forward diffraction theory, the initial estimated value to a surface with a light intensity to be detected, and calculating a complex amplitude distribution of a light intensity map of a light field corresponding to the initial estimated value;

(3) replacing, with a square root of the light intensity map carrying the composite band diffraction information measured by the image acquisition device on a diffraction surface as a real amplitude value, a real part of a complex amplitude calculated in step (2) to obtain a new complex amplitude;

(4) diffractively propagating, through an inverse diffraction theory, the new complex amplitude obtained after the replacement to an estimated surface to be detected, and calculating an estimated value of a phase to be detected;

(5) applying a constraint of a support domain to the calculated estimated value of the phase to be detected, to obtain a new estimated value of the wavefront phase; and (6) updating the initial estimated value in the step (1) with the new estimated value of the wavefront phase, ending iteration when the preset number of iterations reaches, to obtain the emitted phase of the element 6 to be detected, or when the preset number of iterations does not reach, repeating steps (2) to (6).

The present disclosure has the following beneficial effects:

The detection device and the phase retrieval method provided by the present disclosure use the FZP as a light beam convergent element instead of a conventional lens on the basis of a classical iterative phase retrieval method, and make an acquired diffraction spot contain more diffraction information by virtue of a multi-focus characteristic of the FZP. Based on the classical iterative phase retrieval method, a diffraction spot modulated by the FZP is used for retrieval to reconstruct a wider band of a wavefront to be detected. Meanwhile, the method has a simple experimental device, can acquire wide-band diffraction information without changing the off-focus position, and has a higher algorithm convergence speed and higher wavefront reconstruction precision. The precision of the method is higher than a conventional iterative phase retrieval method based on lens modulation, when detecting a wide-band large wavefront error.

BRIEF DESCRIPTION OF THE DRAWINGS

In FIG. 1: 1—laser, 2—attenuation mirror, 3—micro-objective, 4—pinhole filter, 5—collimating lens, 6—element to be detected, 7—FZP, and 8—image acquisition device.

DETAILED DESCRIPTION OF THE EMBODIMENTS

The present disclosure will be described in further detail with reference to the accompanying drawings. It should be understood that the specific embodiments described herein are merely intended to explain but not to limit the present disclosure.

Figure 1:
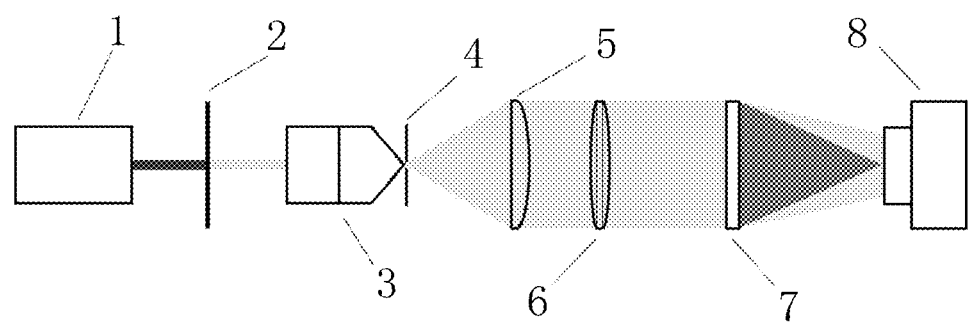
FIG. 1 shows a schematic structure diagram of a phase retrieval detection device based on diffraction information fusion of a Fresnel zone plate (FZP) according to the present disclosure.

As shown in FIG. 1, a phase retrieval detection device based on diffraction information fusion of a Fresnel zone plate (FZP) includes a laser 1, an attenuation mirror 2, a micro-objective 3, a pinhole filter 4, a collimating lens 5, an element 6 to be detected, an FZP 7 and an image acquisition device 8 that are sequentially arranged, where the laser 1 is arranged in parallel with the attenuation mirror 2; the micro-objective 3 is positioned behind the attenuation mirror 2; the pinhole filter 4 is positioned behind the micro-objective 3 and at a convergent focus of the micro-objective 3; the collimating lens 5 is positioned behind the pinhole filter 4, a front focus of the collimating lens 5 is located at a pinhole of the pinhole filter; the element 6 to be detected is positioned behind the collimating lens 5; the FZP 7 is positioned behind the element 6 to be detected; and the image acquisition device 8 is positioned behind the FZP 7 and at an off-focus position of the FZP 7.

As an embodiment, the FZP 7 is a phase FZP, and the image acquisition device 8 is a CCD camera.

The laser 1 is configured to generate laser light having a wavelength of 632.8 nm.

The attenuation mirror 2 is configured to attenuate an excessively strong light beam generated by the laser 1 to prevent the CCD camera from overexposing during spot acquisition.

The micro-objective 3 is configured to converge the light beam generated by the laser 1.

The pinhole filter 4 is configured to perform low-pass filtering on the light beam.

The collimating lens 5 is configured to collimate divergent light into a parallel light beam, where the emitted parallel light beam enters the element 6 to be detected, and an emitted wavefront carries surface error information of the element 6 to be detected.

The FZP 7 is configured to modulate the emitted wavefront and converge the light beam.

The image acquisition device 8 is configured to acquire a diffraction spot.

Figure 2:
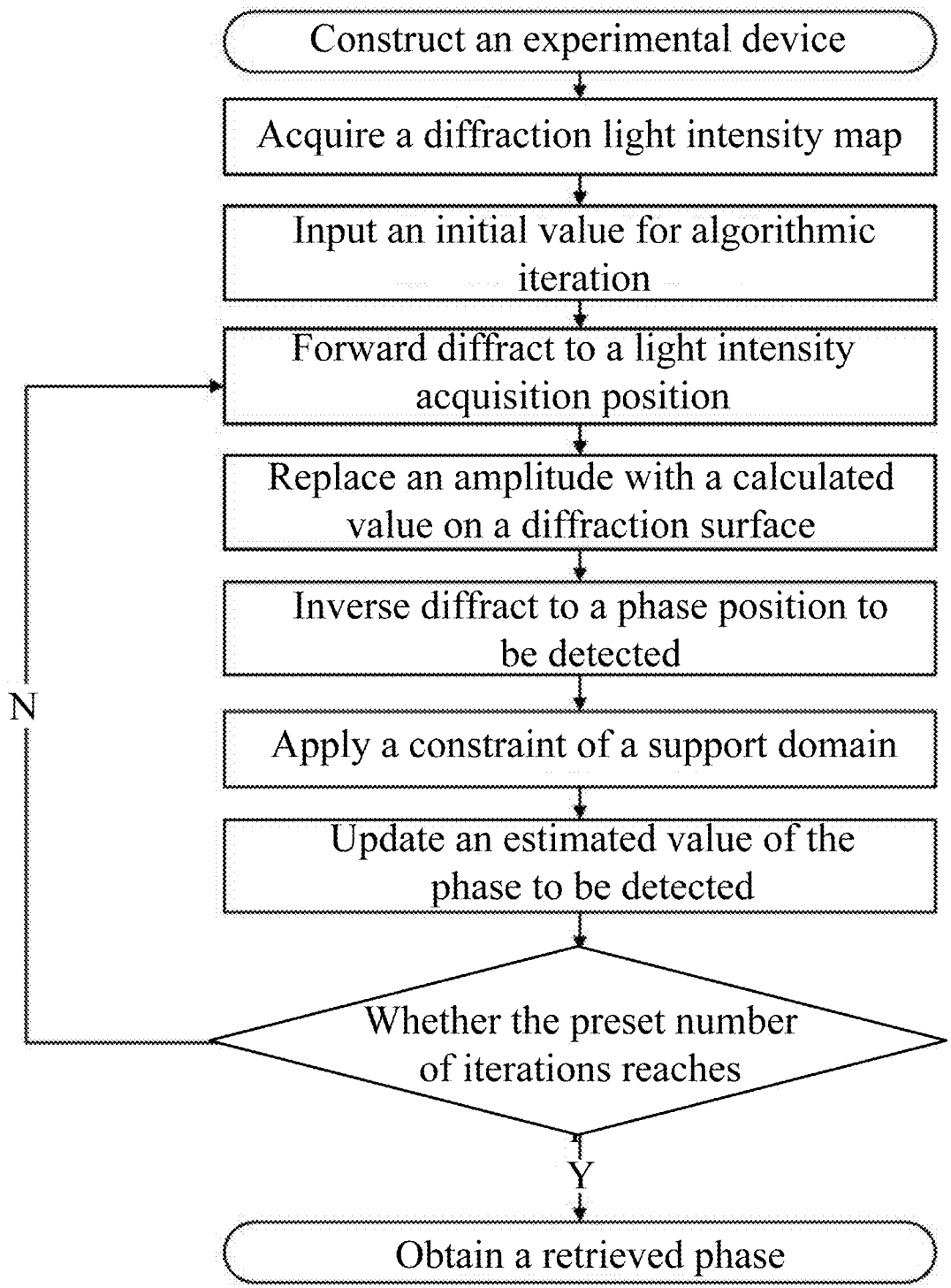
FIG. 2 shows a flow chart of a phase retrieval method according to the present disclosure.

A phase retrieval method based on diffraction information fusion of an FZP is implemented based on the above detection device; and as shown in FIG. 2, the method specifically includes the following steps:

The laser light is generated by the laser 1, where the laser light is sequentially attenuated by the attenuation mirror 2, converged by the micro-objective 3, filtered by the pinhole filter 4 and collimated by the collimating lens 5 into parallel light to enter the element 6 to be detected; an emitted light wave is converged by entering the FZP 7; a light spot carrying composite band diffraction information is acquired by the image acquisition device 8 at an optimal off-focus position of the FZP 7, and a surface error of the element to be detected is calculated with a phase retrieval method.

The phase retrieval method is an iterative phase retrieval method, and specifically includes the following steps:

(1) A phase distribution of the FZP is used as an initial estimated value of a wavefront phase to be detected.

(2) The estimated value of the wavefront phase is diffractively propagated, through a forward diffraction theory, from an estimated surface to be detected to a surface with a light intensity to be detected, and a complex amplitude distribution of a light intensity map of a light field corresponding to the estimated value is calculated. The estimated surface to be detected is a surface where the FZP 7 is located, and the surface with the light intensity to be detected is a surface where the image acquisition device 8 is located.

(3) A real part of a complex amplitude calculated in Step (2) is replaced with a square root of the light intensity map (the light intensity map carrying the composite band diffraction information) of the light field measured by the image acquisition device 8 on a diffraction surface as a real amplitude value to obtain a new complex amplitude.

(4) The new complex amplitude after the replacement is diffractively propagated, through an inverse diffraction theory, to the estimated surface to be detected from the surface with the light intensity to be detected, and an estimated value of a phase to be detected is calculated.

(5) A constraint of a support domain is applied to the calculated estimated value of the phase to be detected, to obtain a new estimated value of the wavefront phase.

(6) The initial estimated value in the Step (1) is updated with the new estimated value of the wavefront phase. Iteration is ended when the preset number of iterations reaches to obtain the emitted phase of the element to be detected, or otherwise, steps (2) to (6) are repeated.

Figure 3:
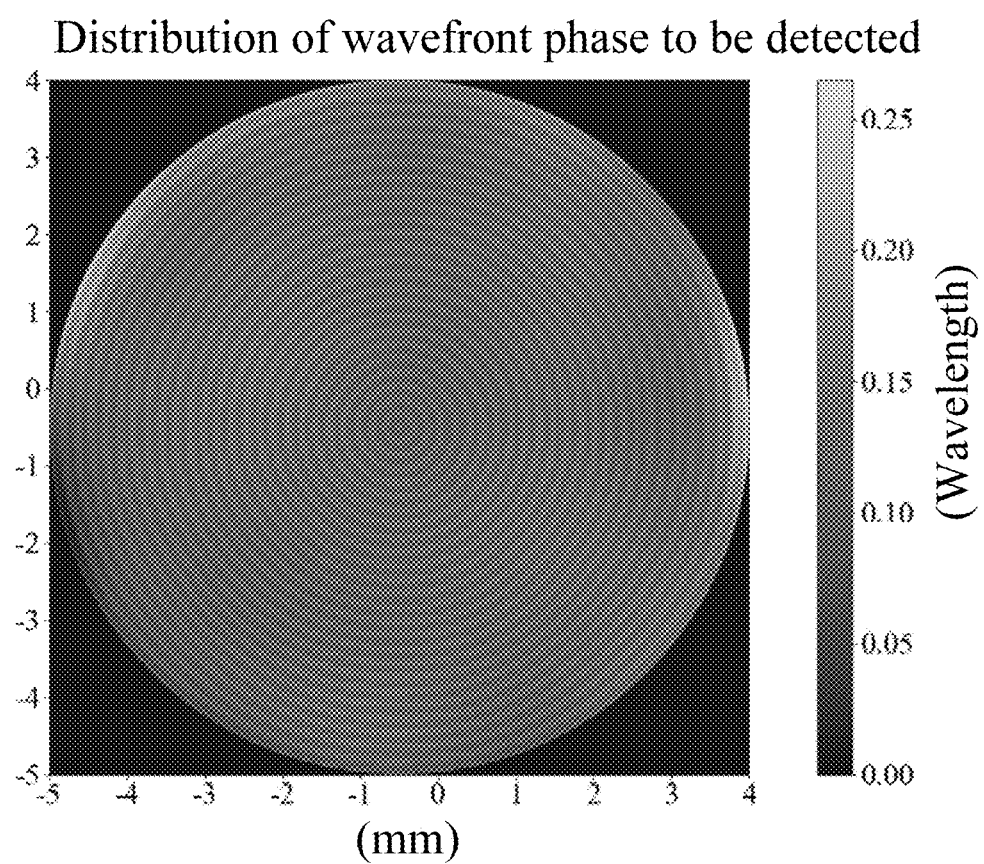
FIG. 3 shows a distribution of a simulated wavefront to be detected according to the present disclosure.
Figure 4:
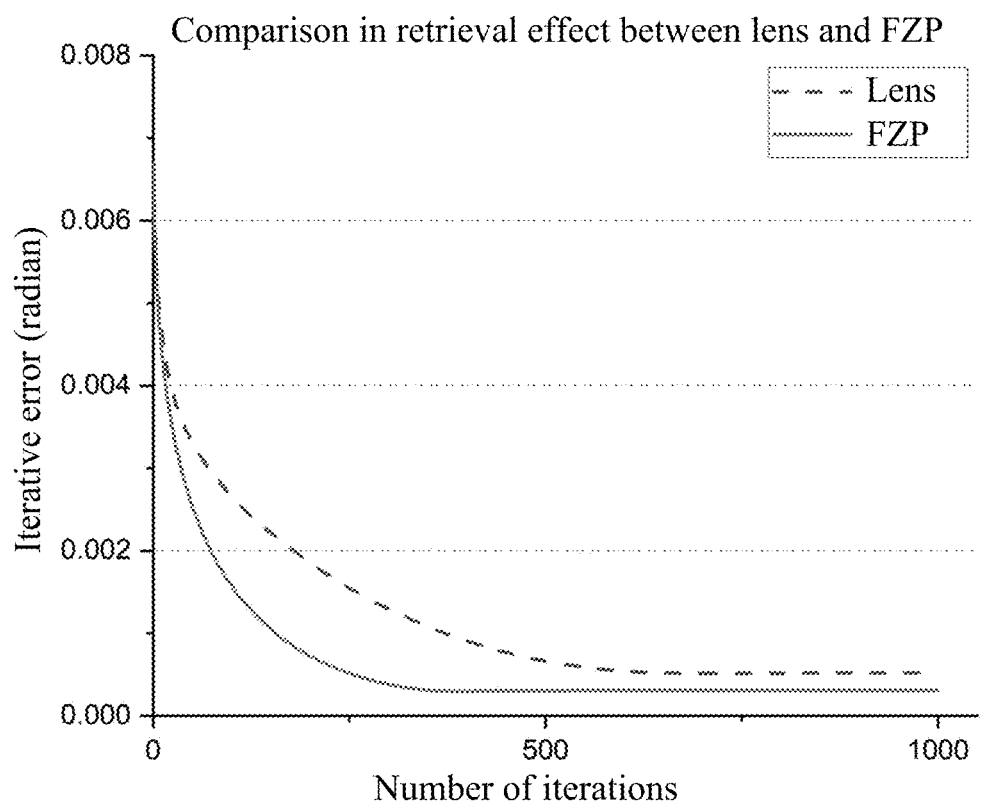
FIG. 4 shows a comparison in retrieval effect between a phase retrieval method based on an FZP modulation and a conventional method based on lens modulation.
Figure 5:
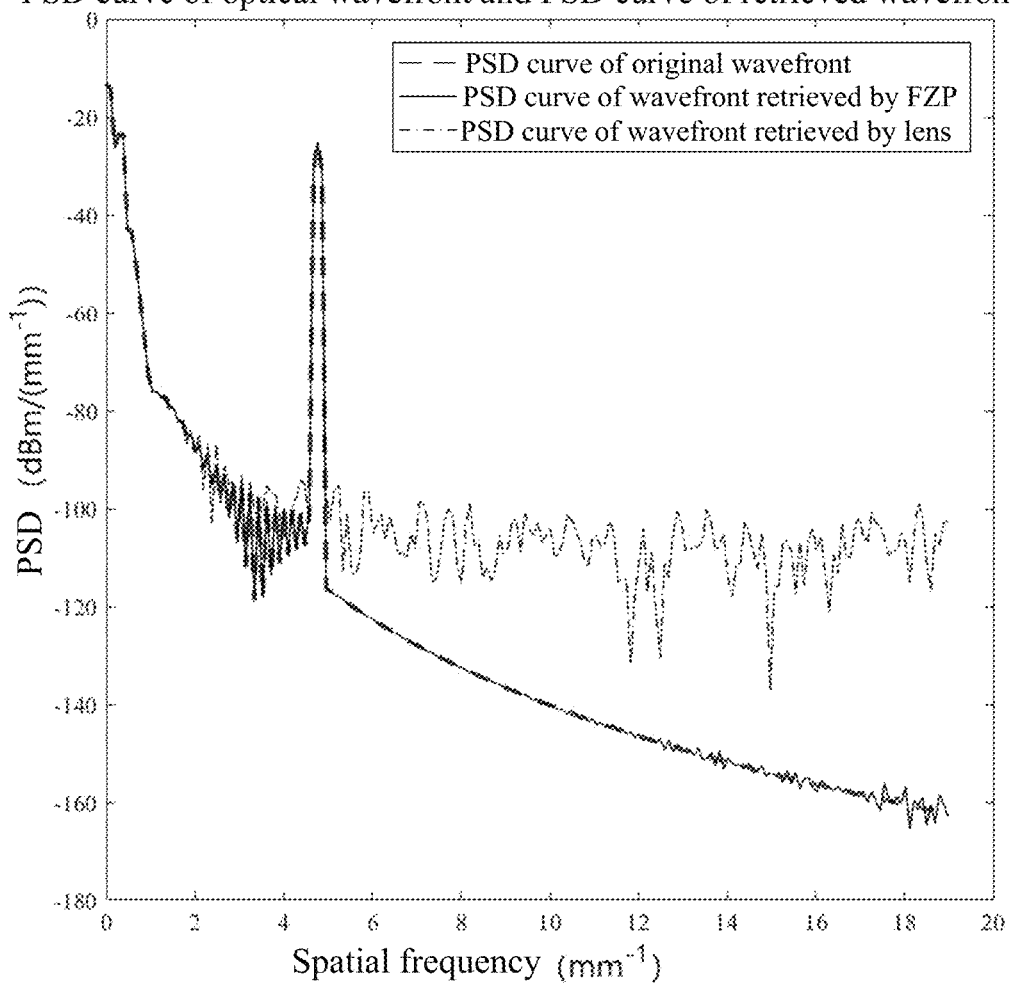
FIG. 5 shows power spectral density (PSD) curves of wavefronts retrieved by the phase retrieval method based on the FZP modulation and the conventional method based on lens modulation.

FIG. 3 to FIG. 5 describe actual examples to which the present disclosure is applied.

FIG. 3 shows a distribution of a simulated wavefront to be detected according to the present disclosure. The wavefront to be detected is a wavefront combined with a low-frequency error component fitted by a Zernike polynomial and a medium-frequency error component of a circular grating structure, where the peak-to-valley (PV) value is about 0.25 of wavelength.

FIG. 4 shows a comparison in retrieval effect between a phase retrieval method based on an FZP modulation and a conventional method based on lens modulation. Due to the limitation of the phase retrieval algorithm, the two modulation methods fall into a stagnation state with a certain number of iterations. However, it can be obviously observed that the phase retrieval method based on the FZP modulation starts to stagnate after about 400 iterations, whereas the method based on lens modulation starts to stagnate after about 600 iterations; and in an ultimate stagnation, the FZP has a smaller iterative error and a higher convergence precision.

FIG. 5 shows power spectral density (PSD) curves of wavefronts retrieved by the phase retrieval method based on the FZP modulation and the conventional method based on lens modulation. The PSD is commonly used to evaluate a distribution of spatial frequencies for machining errors of optical parts. As can be seen from the figure, both methods yield an equivalent retrieval effect on a low band; but on a high band, the phase retrieval method based on lens modulation cannot retrieve an original wavefront, whereas the phase retrieval method based on the FZP modulation can still retrieve the original wavefront, and the obtained PSD curve is in well agreement with an original PSD curve.

A person of ordinary skill in the art may understand that the above descriptions are only preferred embodiments of the present disclosure and are not intended to limit the present disclosure. Although the present disclosure is described in detail with reference to the foregoing embodiments, a person skilled in the art can still make modifications to the technical solutions described in the foregoing embodiments, or make equivalent replacement to some technical characteristics thereof. Any modifications and equivalent replacements made within the spirit and scope of the present disclosure should be included within the protection scope of the present disclosure.

What is claimed is:

1. A phase retrieval method based on diffraction information fusion of a Fresnel zone plate (FZP), wherein the method is implemented based on a phase retrieval detection device based on the diffraction information fusion of the FZP, the detection device comprises: a laser (1), an attenuation mirror (2), a micro-objective (3), a pinhole filter (4), a collimating lens (5), an element (6) to be detected, an FZP (7) and an image acquisition device (8) that are sequentially arranged along a light path, wherein the laser (1) is arranged in parallel with the attenuation mirror (2); the micro-objective (3) is positioned behind the attenuation mirror (2); the pinhole filter (4) is positioned behind the micro-objective (3) and at a convergent focus of the micro-objective (3); the collimating lens (5) is positioned behind the pinhole filter (4), a front focus of the collimating lens (5) is located at the pinhole filter (4); the element (6) to be detected is positioned behind the collimating lens (5); the FZP (7) is positioned behind the element (6) to be detected; and the image acquisition device (8) is positioned behind the FZP (7) and at an off-focus position of the FZP (7), and the phase retrieval method comprises the following steps:

generating laser light by the laser (1), wherein the laser light is sequentially attenuated by the attenuation mirror (2), converged by the micro-objective (3), filtered by the pinhole filter (4) and collimated by the collimating lens (5) into parallel light to enter the element (6) to be detected; converging, by entering the FZP (7), an emitted light wave of the element (6) to be detected; acquiring, by the image acquisition device (8), at an optimal off-focus position of the FZP (7), a light intensity map carrying composite band diffraction information; and obtaining an emitted phase of the element (6) to be detected with the phase retrieval method, to obtain a surface error distribution of the element (6) to be detected;

wherein the phase retrieval method is an iterative phase retrieval method; and the calculating, with the phase retrieval method, the emitted phase of the element (6) to be detected comprises:

(1) using a phase distribution of the FZP (7) as an initial estimated value of a wavefront phase to be detected;

(2) diffractively propagating the laser light from the FZP (7) to the image acquisition device (8), and calculating a complex amplitude distribution of a light intensity map of a light field corresponding to the initial estimated value;

(3) replacing a real part of a complex amplitude calculated in step (2) with a square root of the light intensity map carrying the composite band diffraction information measured by the image acquisition device (8) on a diffraction surface as a real amplitude value, to obtain a new complex amplitude;

(4) calculating an estimated value of a phase to be detected by using the new complex amplitude based on an inverse diffraction theory;

(5) applying a constraint of a support domain to the calculated estimated value of the phase to be detected, to obtain a new estimated value of the wavefront phase; and (6) updating the initial estimated value in the step (1) with the new estimated value of the wavefront phase, and repeating steps (2) to (6) until a preset number of repetitions are reached, to obtain the emitted phase of the element (6) to be detected.

2. The phase retrieval method based on the diffraction information fusion of the FZP according to claim 1, wherein the FZP (7) is a phase zone plate.

3. The phase retrieval method based on the diffraction information fusion of the FZP according to claim 1, wherein the image acquisition device (8) is a charge coupled device (CCD) camera.

4. The phase retrieval method based on the diffraction information fusion of the FZP according to claim 1, wherein the laser (1) is configured to generate laser light having a wavelength of 632.8 nm.

\* \* \* \* \*